United States Patent

Kampfer et al.

[15] 3,660,103

[45] May 2, 1972

[54] SPECTRAL SENSITIZATION BY POLYMETHINE DYES WHICH CONTAIN AN UNSATURATED ALKYL SULFONIC ACID GROUP

[72] Inventors: Helmut Kampfer, Cologne-Stammheim; Oskar Riester, Leverkusen; Johannes Gotze, Bergisch-Neukirchen, all of Germany

[73] Assignee: AGFA-Gevaert Aktiengesellschaft, Leverkusen, Germany

[22] Filed: Aug. 30, 1968

[21] Appl. No.: 756,368

Related U.S. Application Data

[63] Continuation-in-part of Ser. No. 446,095, Apr. 6, 1965, abandoned.

[30] Foreign Application Priority Data

Apr. 21, 1964  Germany..............................A 45821

[52] U.S. Cl. ............................................................96/137
[51] Int. Cl. ..........................................................G03c 1/08

[58] Field of Search ...........................................96/106, 102

[56] References Cited

UNITED STATES PATENTS

| | | |
|---|---|---|
| 3,397,981 | 8/1968 | Lincoln et al............................96/102 |
| 3,364,026 | 1/1968 | Rees........................................96/102 |
| 3,177,210 | 4/1965 | Rosenoff..................................96/106 |

FOREIGN PATENTS OR APPLICATIONS 742,112  11/1955  Great Britain..........................96/106

Primary Examiner—Norman G. Torchin
Assistant Examiner—Edward C. Kimlin
Attorney—Connolly and Hutz

[57] ABSTRACT

The invention relates to photographic materials which are optically sensitized with cyanine dyes containing at least 1 nitrogen-containing heterocyclic grouping, the nitrogen of which is substituted with an olefinically unsaturated alkyl sulfonic acid grouping. Such dyes provide more sensitization than corresponding dyes in which the alkyl is saturated.

6 Claims, No Drawings

SPECTRAL SENSITIZATION BY POLYMETHINE DYES WHICH CONTAIN AN UNSATURATED ALKYL SULFONIC ACID GROUP

This application is in part a continuation of prior application Ser. No. 446,095, filed Apr. 6, 1965, now abandoned.

In recent years, polymethine dyes having nitrogen-containing heterocyclic groupings in which one or more sulfonic acid groups are attached to the nitrogen atom through alkylene groups, have become of special importance as spectral sensitizers for photographic silver halide emulsions. It has been found that such sensitizers have several important advantages over the usual basic cyanines, especially their insensitivity to other additives which have to be used in the photosensitive systems, such as wetting agents, stabilizers, color couplers and dyes, which are used as antihalation agents or in silver dye bleaching process. In addition, they can be thoroughly washed out, which is especially important for obtaining good white portions of the image when paper supports are used. In spite of the advantages of the above sensitizing dyes their sensitizing action is in many cases limited and new sensitizing dyes having increased sensitizing effect are desirable.

Accordingly it is an object of the invention to provide photographic materials which are sensitized with new dyes having improved sensitizing action.

It has now been found that this object is attained with a new group of polymethine dyes having a nitrogen containing at least one heterocyclic ring, such nitrogen atom carries an olefinically unsaturated alkyl sulfonic acid radical.

Suitable heterocycles for the new polymethine dyes according to the invention are those customarily in cyanine dyes, particularly oxazole, benzoxazole, thiazole, benzthiazole, thiazoline, selenazole, benzselenazole, pyrrolenine, indolenine, pyridine, quinoline, pyrimidine, thiadiazole, oxadiazole and tetrazole. The desired substitution is obtained by reacting a readily obtained by reacting a reactive form of the heterocycle with, for example, the propenesultone or 2,3-dimethyl-2-butene-1,4-sultone described by F.G. Bordwell and coworkers (see J. Amer. chem. Soc. 81, page 2002, (1959).

Substitution of a ring nitrogen atom with an olefinically unsaturated alkyl sulfonic acid group unexpectedly increases the sensitizing effect of the dye. It is possible that this difference is due to the spatial orientation caused by the rigid alkene compound whereas the free rotatability of the alkyl-sulfonic acid group may give rise to a quite different molecular configuration.

The improvement of the present invention is not restricted to any special kind of a sensitizing dye. Suitable dyes include the ordinary mono- or polymethinecyanines, preferably trimethinecyanines, merocyanines, trinuclear cyanines such as neocyanines or rhodacyanines. These are described in the handbook of F.H. Hamer "The Cyanine Dyes and related Compounds" published by Interscience Publishers (1964).

Particular utility is exhibited by dyes of the following general formulas:

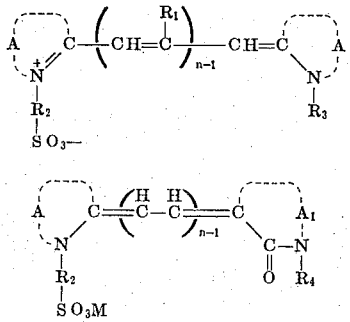

wherein $R_1$ = hydrogen or alkyl having preferably up to three carbon atoms or alkylthio in which the alkyl has up to three carbon atoms;

$R_2$ = an olefinically unsaturated alkylene group having between three and six carbon atoms, preferably the divalent radicals —$CH_2$—CH = CH— and —$CH_2$—CH = CH—$CH_2$ which may be substituted by lower alkyl groups, such as methyl or ethyl.

$R_3$ = alkyl preferably having up to five carbon atoms particularly methyl, ethyl or propyl, or $R_2SO_3M$;

$R_4$ = alkyl having up to five carbon atoms;

$n$ = an integer between 1 and 5;

A = the non-metallic ring members necessary to complete a five- or six-membered nitrogen-containing heterocyclic ring, which may contain a fused benzene or naphthalene ring. Suitable heterocyclic rings are, for example, those of the thiazole series (e.g., thiazole, 4-methylthiazole, 5-methylthiazole, e-phenylthiazole, 5-phenylthiazole, 4,5-dimethylthiazole, 4,5-diphenylthiazole, 4-(2-thienyl)-thiazole, benzothiazoles such as benzothiazole, 4-chlorobenzothiazole, 5-chlorobenzothiazole, 6-chlorobenzothiazole, 7-chlorobenzothiazole, 4-methylbenzothiazole, 5-methylbenzothiazole, 6-methylbenzothiazole, 5-bromobenzothiazole, 6-bromobenzothiazole, 4-phenylbenzothiazole, 5-phenylbenzothiazole, 4-methoxybenzothiazole, 5-methoxybenzothiazole, 6-methoxybenzothiazole, 5-iodobenzothiazole, 6-iodobenzothiazole, 4-ethoxybenzothiazole, 5-ethoxybenzothiazole, tetrahydrobenzothiazole, 5,6-dimethoxybenzothiazole, 5,6-dioxymethylenebenzothiazole, 5-hydroxybenzothiazole, 6-hydroxybenzothiazole, naphthothiazoles including α-naphthothiazole, β-naphthothiazole, 5-methoxy-β-naphthothiazole, 5-ethoxy-β-naphthothiazole, 7-methoxy-α-naphthothiazole, 8-methoxy-α-naphthothiazole, those of the thianaphtheno-7',6',4,5-thiazole, 4-methoxythianaphtheno-7',6'4,5-thiazole, etc., those of the oxazole series (e.g., e-methyloxazole, 5-methyloxazole, 4-phenyloxazole, 4,5-diphenyloxazole, 4-ethyloxazole, 4,5-dimethyloxazole, 5-phenyloxazole, benzoxazoles including benzoxazole, 5-chlorobenzoxazole, 5-phenylbenzoxazole, 5-methylbenzoxazole, 6-methylbenzoxazole, 5,6-dimethylbenzoxazole, 4,6-dimethylbenzoxazole, 5-methoxybenzoxazole, 6-methoxybenzoxazole, 5-ethoxybenzoxazole, 6-methoxybenzoxazole, 5-ethoxybenzoxazole, 6-chlorobenzoxazole, 5-hydroxybenzoxazole, 6-hydroxybenzoxazole, napthoxazoles, including α-naphthoxazole, β-naphthoxazole, etc.), those of the selenazole series (e.g. 4-methylselenazole, 4-phenylselenazole, benzoselenazoles including benzoselenazole, 5-chlorobenzoselenazole, 5-methoxybenzoselenazole, 5-hydroxybenzoselenazole, tetrahydrobenzoselenazole, napthoselenazole, including α-naphthoselenazole, β-naphthoselenazole etc.) those of the 3,3-dialkylindolenine series (e.g. 3,3-dimethylindolenine, 3,3,5-trimethylindolenine, 3,3,7-trimethylindolenine, etc.), those of the pyridine series (e.g. pyridine, 3-methylpyridine, 4-methylpyridine, 6-methylpyridine, 3,4-dimethylpyridine 3,5-dimethylpyridine, 3,6-dimethylpyridine, 4-chloropyridine, 5-chloropyridine, 6-chloropyridine, 3-hydroxypyridine, 4-hydroxypyridine, 6-hydroxypyridine, 3-phenylpyridine, 4-phenylpyridine, 6-phenylpyridine, 2,3-dimethylpyridine, quinolines, including quinoline, 3-methylquinoline, 5-methylquinoline, 7-methylquinoline, 8-methylquinoline, 6-chloroquinoline, 8-chloroquinoline, 6-methoxyquinoline, 6-ethoxyquinoline, 6-hydroxyquinoline, 8-hydroxyquinoline, 8-methylquinoline, those of the oxazine or benzoxazine series, those of the thiodiazole, oxadiazole, imidazole or benzimidazole series, those of the pyrimidine series, those of the pyrroline or of the indoline series, the two heterocyclic rings in any such dye can be the same or different;

$A_1$ = the ring members necessary for completing a thiohydantoin or a rhodanine ring;

M = a cation. The chemical nature of the cation is not critical and it can be selected in accordance with the requirement of the method of making the sensitive dye. Generally M is a cation of an alkali metal, such as sodium or potassium, or an ammonium cation which may be substituted with lower alkyl groups, for example, methyl or ethyl-ammonium cations.

The preparation of the new dyes may be carried out by the usual methods of cyanine chemistry. It has been found that the reactions leading to the dyes proceed very smoothly. In most cases, the dyes crystallize in a high state of purity from the reaction solutions. This leads to unexpectedly good yields of pure dyes. This is a further advantage of the new dyes.

The following are individual examples of suitable dyes:

1. 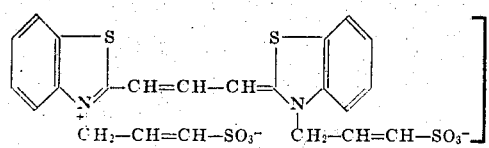

2. 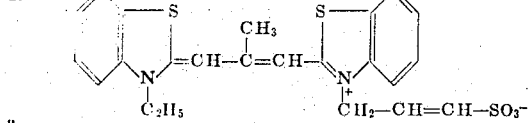

3. 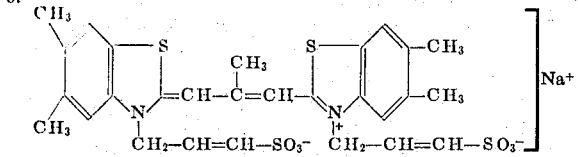

4. 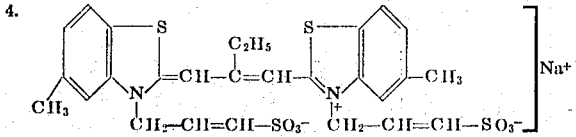

5. 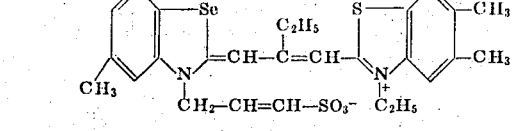

6. 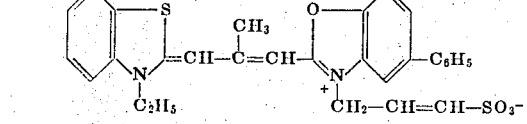

7. 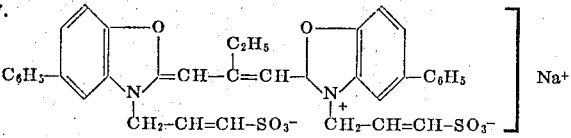

8. 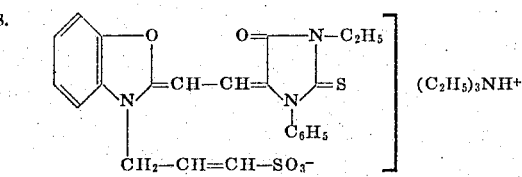

9. 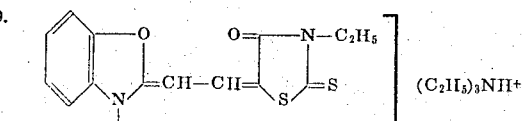

10. 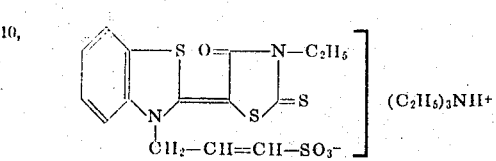

11. 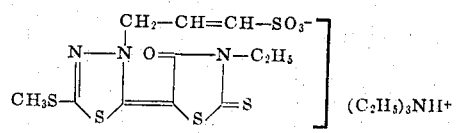

12. 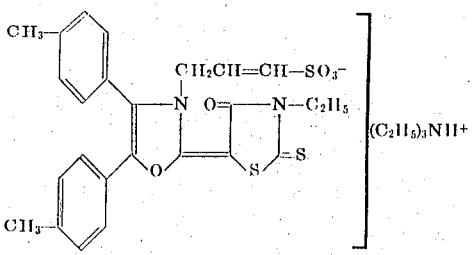

13. 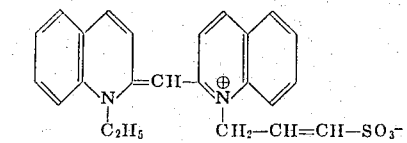

14. 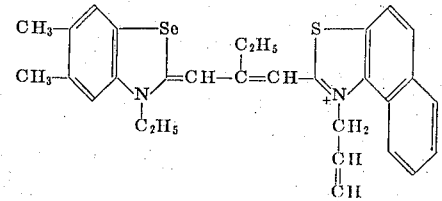

15. 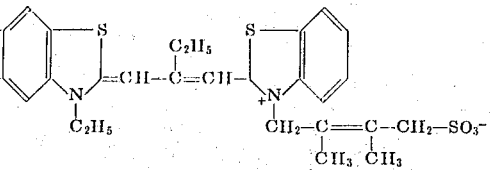

16. 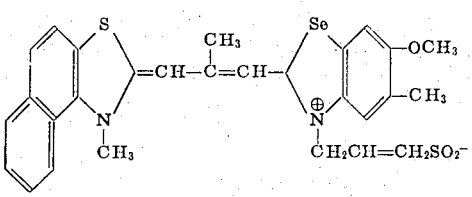

17. 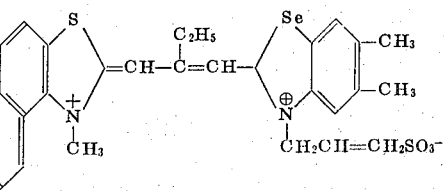

18. 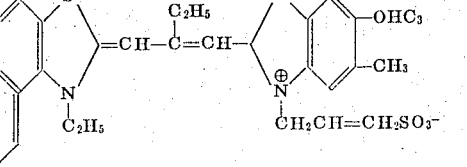

19. 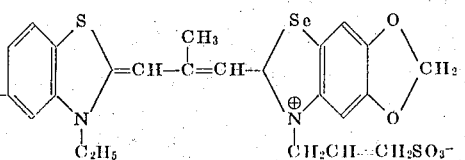

20. 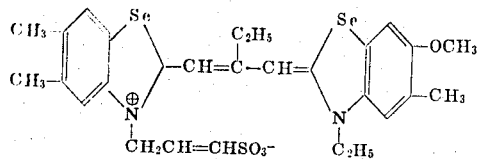
21. 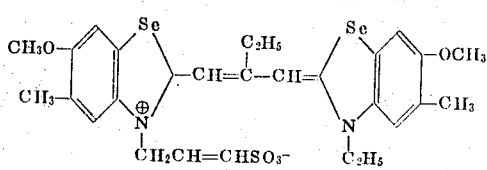
22. 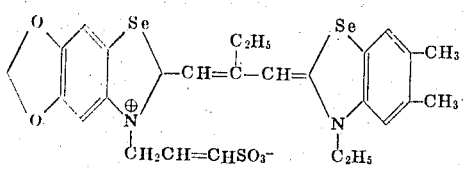
23. 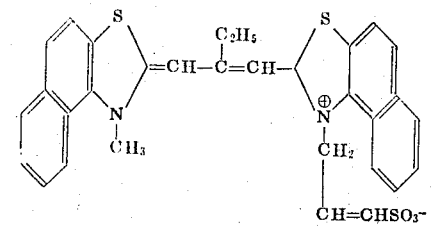
24. 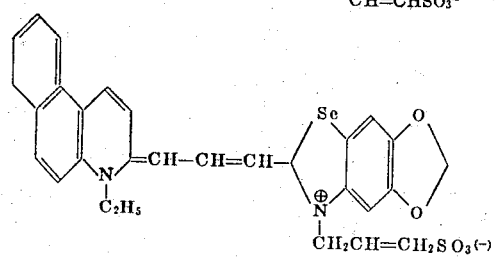
25. 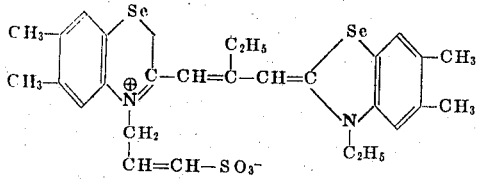
26. 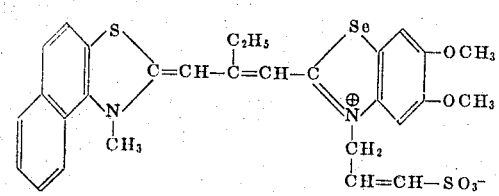
27. 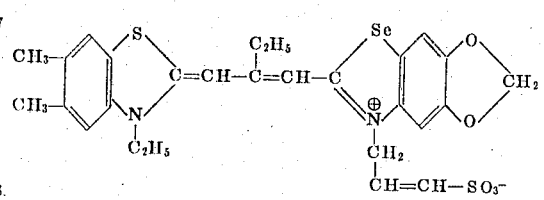
28. 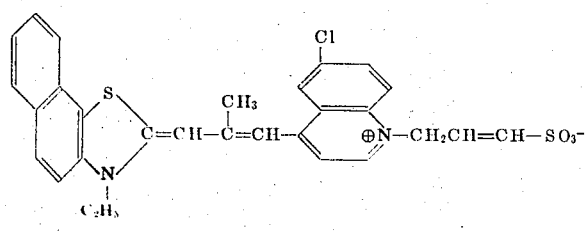
29. 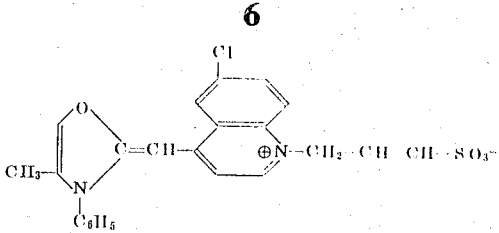
30. 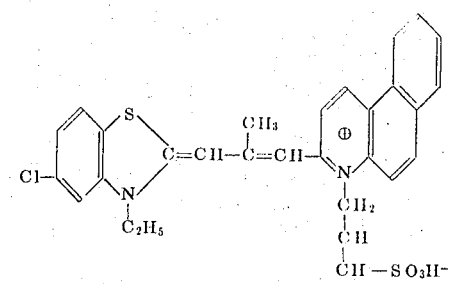
31. 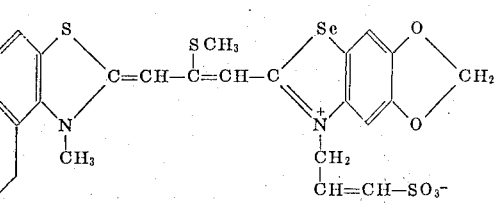
32. 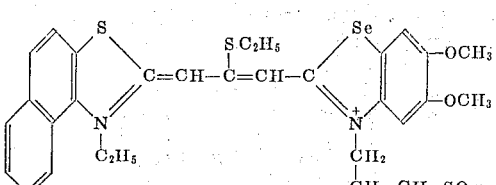
33. 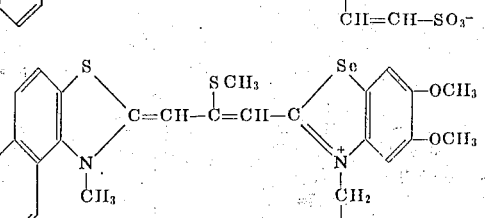
34. 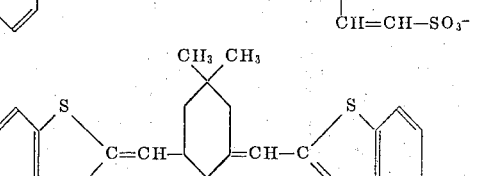
35. 
36. 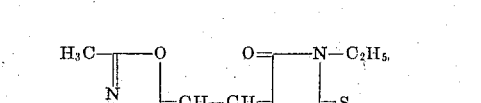
37. 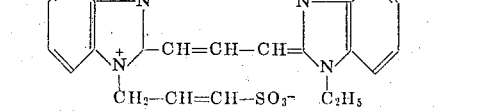

38.

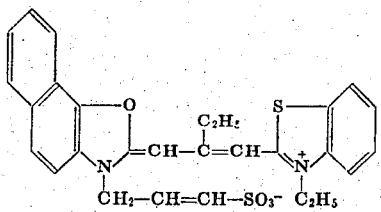

Typical preparations for the dyes of the present invention are as follows, the temperatures being in degrees centigrade:

DYESTUFF OF FORMULA 1 a. 7.2 g. of propenesultone are heated to 120° for 30 minutes with 10 g. of 2-methylbenzthiazole. After cooling, the solidified mass is washed with acetone. 14.8 g. of the quaternary salt

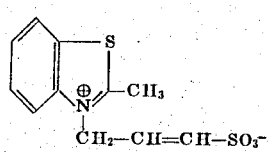

is obtained. It can be recrystallized from methanol/water. Decomposition occurs at 281°–280°.

b. 2.1 g. of the quaternary salt prepared under (a) are heated to boiling for 15 minutes with 6 ml. of m-cresol, 10 ml. of acetic anhydride, 2 ml. of orthoformic acid ethyl ester and 0.8 g. of triethylamine. 2 g. of dyestuff 1 crystallize on cooling. M.P. 228° – 230°. Absorption maximum: 561 millimicrons, sensitization maximum: 600 millimicrons.

DYESTUFF OF FORMULA 2

1.6 g. of the quaternary salt prepared by step a) for Formula 1 are heated at 20° for 18 hours with 2.4 g. of 2-(β-methyl-β-methylmercaptovinyl)-3-ethylbenzthiazolium-methyl-sulfate in 8 ml. of m-cresol, 16 ml. of pyridine and 12 g. of triethylamine and then stirred for 15 minutes at elevated temperature. The dyestuff is precipitated with ether and recrystallized from ethanol. Yield 1.7 g., M.P. 278° – 280°. Absorption maximum 545 millimicrons, sensitization maximum 600 millimicrons.

DYESTUFF OF FORMULA 3

11.5 g. of 2,5,6-trimethylbenzthiazole are quaternized with 7.2 g. of propenesultone as indicated for formula 1. 14.6 g. of quaternary salt are obtained (M.P. 272°–273°).

3 g. of this quaternary salt are boiled for 15 minutes with 8 ml. of m-cresol, 4 ml. of orthoacetic acid ethyl ester, 15 ml. of pyridine and 3 ml. of triethylamine. After cooling, the dyestuff is precipitated with ether and converted into the sodium salt. Yield: 2.1 g., decomposition at 257°. Absorption maximum: 550 millimicrons, sensitization maximum: 650 millimicrons.

DYESTUFF OF FORMULA 4

From 3 g. of the quaternary salt (M.P. 280°–283°) prepared from 2,5-dimethylbenzthiazole and propenesultone, 3.3 g. of dyestuff are obtained with orthopropionic acid ethyl ester as indicated in the example for formula 3. Absorption maximum: 560 millimicrons, sensitization maximum: 660 millimicrons.

DYESTUFF OF FORMULA 5

3.2 g. of the quaternary salt obtained from 2,5-dimethylbenzselenazole and propenesultone are heated for 15 minutes with 4 g. of 2-(β-ethyl-β-methylmercapto)-3-ethyl-5,6-dimethylbenzthiazolium-methylsulfate and 1.1 g. of triethylamine in 20 ml. of pyridine and 50 ml. of methanol are added. On cooling, 3.2 g. of dyestuff crystallize out. M.P. 286°–288°. Absorption maximum 560 millimicrons. Sensitization maximum: 660 millimicrons.

DYSTUFF OF FORMULA 6

The reaction of 3.3 g. of the quaternary salt prepared from 2-methyl-5-phenylbenzoxazole and propenesultone with 3.6 g. of 2-(β-methyl-β-methylmercapto)-3-ethylbenzthiazolium-methylsulfate yields 1.7 g. of dyestuff by the method indicated in the preparation for formula 5. Decomposition at 277.5° to 278.5°. Absorption maximum: 528 millimicrons, sensitization maximum: 590 millimicrons.

DYESTUFF OF FORMULA 7:

The dyestuff is obtained by reacting orthopropionic acid ethyl ester in m-cresol-acetic anhydride-triethylamine with the quaternary salt prepared from 2-methyl-5-phenylbenzoxazole and propenesultone. Absorption maximum: 507 millimicrons, sensitization maximum: 550 millimicrons.

DYESTUFF OF FORMULA 8:

a. 7 g. of 2-methyl-3-(3-sulfopropenyl)-benzoxazolium betaine are boiled for 5 minutes with 12 g. of diphenylformamidine in 35 ml. of acetic anhydride. On addition of acetone, 9.8 g. of the intermediate product

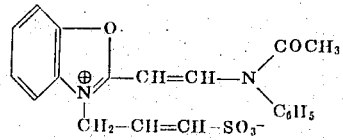

crystallize out. M.P. 215°–217°.

b. 5.3 g. of this intermediate product are boiled for 20 minutes with 3.5 g. of 1-phenyl-3-ethyl-2-thiohydantoin in 50 ml. of methanol with addition of 4 ml. of triethylamine. After the addition of isopropanol, 5 g. of dyestuff are obtained and recrystallized from ethanol. M.P. 234° – 236°. Absorption maximum: 485 millimicrons, sensitization maximum: 525 millimicrons.

DYSTUFF OF FORMULA 9

Heating 1.6 g. of 3-ethyl rhodanine in 10 : 1 mixture of acetic anhydride and triethylamine at 90° with 4 g. of the intermediate product metnioned under (a) in the preparation for formula 8 yield 4.4 g. of dyestuff. M.P. 173° – 175°, absorption maximum: 492 millimicrons, sensitization maximum: 550 millimicrons.

DYESTUFF OF FORMULA 10

1.5 g. of the quaternary salt (M.P. 254°–255°) obtained from 2-methylmercaptobenzthiazole and propene sultone are heated to boiling for 15 minutes with 0.8 g. of 3-ethylrhodanine and 0.5 g. of triethylamine in 5 ml. of pyridine. The dyestuff is precipitated on addition of ethyl acetate and is recrystallized from ethanol. Yield: 1.9 g., M.P. 183° – 186°, sensitization maximum: 475 millimicrons.

DYESTUFF OF FORMULA 11

2,5-bis-(methylmercapto)-1,3,4-thiadiazole is quaternized with propenesultone at 130°. 3.7 g. of the quaternary salt (M.P. 187° – 189°) are stirred for 2 hours at 20° with 2 g. of 3-ethyl rhodanine in 15 ml. of ethanol with addition of 2.6 g. of triethylamine. The dyestuff crystallizes at 0° and can be purified from acetone. Yield: 4.6 g., M.P. 153° – 155°, sensitization maximum: 475 millimicrons.

DYSTUFF OF FORMULA 12

6 g. of 2-methylmercapto-3-(3-sulfopropenyl)-4,5-di-p-tolyloxazolium betaine are left to react at room temperature for 3 hours with 2.4 g. of 3-ethyl rhodanine and 1.5 ml. of triethylamine in 14 ml. of pyridine. The dyestuff is precipitated by addition of isopropanol and triethylamine and is recrystallized from methanol/isopropanol. M.P. 210° – 220°, sensitization maximum: 470 millimicrons.

DYESTUFF OF FORMULA 13

The dyestuff is prepared from 2.6 g. of 1-(3-sulfopropenyl)-quinaldinium betaine and 3.1 g. of 1-ethyl-2-methylmercaptoquinolinium methyl sulfate by heating in triethylamine/ethanol. Yield: 3.4 g., M.P. 228° – 231°, absorption maximum: 522 millimicrons, sensitization maximum: 579 millimicrons.

DYESTUFF OF FORMULA 14

2-methyl-naphtho-[1,2:d]-thiazole is quaternized with propenesultone at 170° to 180°. The quaternary salt obtained is converted into a dyestuff with 2-($\beta$-ethyl-$\beta$-methyl-mercaptovinyl)-3-ethyl-5,6-dimethyl-benzoselenazoliummethylsulfate in alcohol/triethylamine. M.P. 240°, absorption maximum: 578 millimicrons, sensitization maximum: 660 millimicrons.

DYESTUFF OF FORMULA 15

2,5-Dimethylbenzthiazole is quaternized at 130° with 2,3-dimethyl-butene-sultone. The quaternary salt obtained reacts with 2-($\beta$-ethyl-$\beta$-methylmercaptovinyl)-3-ethyl-5,6-dimethylbenzthiazolium-methylsulfate in alcohol/triethylamine to produce the dyestuff. M.P. 191°–193°, absorption maximum: 565 millimicrons, sensitization maximum: 640 millimicrons.

Silver halide emulsion layers which contain silver chloride, silver bromide or mixtures thereof and which might additionally contain up to 10 mol percent of silver iodide can be used as light-sensitive layers. Gelatin is preferred as binder, but this can be wholly or partially replaced by other layer-forming, hydrophilic colloids, depending upon the properties which are required. Suitable, for example, are polyvinyl alcohol, polyvinyl pyrrolidone, starch or starch ether, alginic acid and derivatives thereof such as salts particularly with alkali metals, esters or amides or carboxymethyl cellulose and the like.

The dyes of the present invention are advantageously incorporated in the washed and finished emulsion and should be uniformly distributed throughout the emulsion. The methods of incorporating the dyes in an emulsion are simple and well known to those skilled in the art of emulsion making. It is convenient to add the dyes from solution in appropriate solvents such as alcohols and phenols or in a mixture of those solvents with water. The solvent must be compatible with and substantially free from any deleterious effect on the silver halide emulsion. Water or methanol or a mixture thereof has proven satisfactory as a solvent for the majority of the new dyes.

The concentration of the sensitizing dyes of the present invention in the silver halide emulsion can vary widely, for example, from about 2 – 200 mg. preferably 10 – 60 mg. per kg. of the emulsion. The concentration of the dye will vary according to the type of light-sensitive material in the emulsion and according to the sensitization desired. The suitable and optimal concentration for any given emulsion will be apparent to those skilled in the art upon making the ordinary tests customarily used in the art of emulsion making.

The photographic emulsions may be coated on any of the photographic supports including paper, cellulose esters such as cellulose acetate or nitrate, polystyrene, polyesters in particular on the basis of polyethylene terephthalate, polycarbonates, preferably of bis-hydroxyphenyl alkanes, and the like.

Photographic silver emulsions containing the sensitizing dyes of the invention can also contain chemical sensitizers, for instance sulfur compounds and salts of noble metals such as gold, ruthenium, rhodium, palladium, iridium and platinum.

The emulsions may also contain stabilizers such as organic mercury compounds, heterocyclic compounds, in particular having mercapto substituted heterocyclic rings, such as triazoles, tetrazoles or azaindenes disclosed for instance by Birr in "Z. wiss. Phot.", Vol. 47, 1952, pages 2 – 28.

The emulsions can be hardened by addition of the usual hardeners such as formaldehyde and chrome alum. The emulsions may also contain speed-increasing compounds and other additives customarily employed such as coating plasticizers.

If the emulsions are to be used for the production of colored photographic images, they can also contain the usual color couplers.

PHOTOGRAPHIC EXAMPLE

To 1 kg. of a highly sensitive negative emulsion are added 30 mg. of the dyestuff of formula 4. 12 g. of the color-forming compound 1-hydroxy-2-naphthoic acid-(2'-methyl-stearyl-amino-5'-sulfonic acid sodium)-anilide are then added as a 5 percent solution in water. After exposure to red light and development in a color developer, the reacting emulsion shows a sensitivity 50 percent higher than that of an emulsion containing the same amount of the corresponding dyestuff prepared with propane-sultone instead of propenesultone. The same difference in sensitivity is found when the quantity of sensitizer added is increased to 45 or 60 mg./kg. of emulsion. Similar results are also obtained with the other dyes of the present invention.

The sensitizing dyes of the present invention can also be utilized in light-sensitive materials which are to be used for the silver-dye-bleach process. Those materials contain imagewise-bleaches azo dyes added to light-sensitive silver halide emulsions.

The dyes of the present invention are also suitable for the optical sensitization of photo-conductive layers, which are to be used for the electro-photographic production of images. Suitable photoconductive layers consist essentially of photoconductive compounds, particular zinc oxide dispersed in an insulating binding agent.

We claim:

1. A light-sensitive silver halide emulsion containing a sensitizing amount of a compound having the formula:

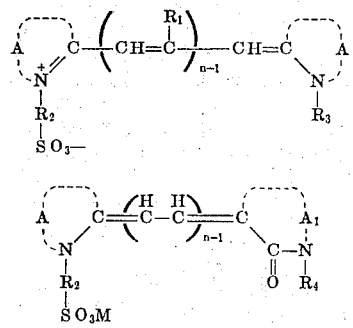

wherein
- $R_1$ represents hydrogen or alkyl having up to three carbon atoms;
- $R_2$ represents an olefinically unsaturated alkylene group having between 3 and 6 carbons;
- $R_3$ represents alkyl having up to five carbon atoms or the grouping —$R_2$—$SO_3M$;
- $R_4$ represents alkyl having up to five carbon atoms;
- A stands for the ring members necessary for completing a thiazole, oxazole, selenazole, pyridine, 3,3-dialkyl-indolenine, oxazine, thoidiazole, oxadiazole, imidazole or pyrimidine ring;
- A' stands for the ring members necessary for completing a thiohydantoin or a rhodanine ring;
- M is a cation and
- n is an integer between 1 and 5.

2. The combination of claim 1 in which the dye has the following formula

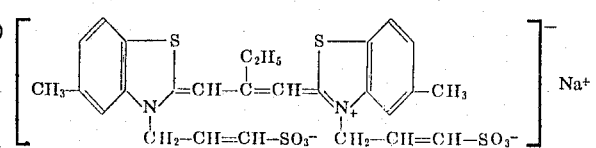

3. The combination of claim 1 in which the dye has the following formula:
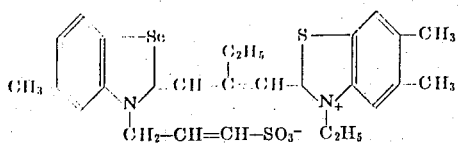
4. The combination of claim 1, in which the dye has the following formula:
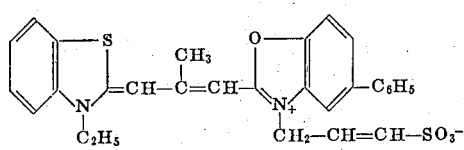
5. The combination of claim 1 in which the dye has the following formula:
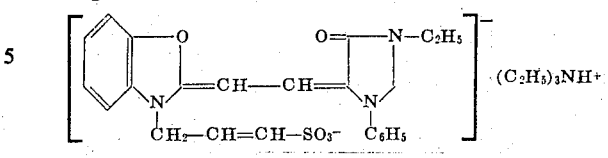
6. The combination of claim 1 in which the dye has the following formula:
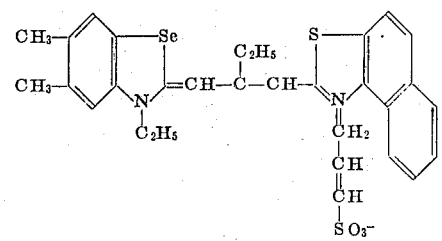
* * * * *

UNITED STATES PATENT OFFICE
CERTIFICATE OF CORRECTION

Patent No. 3,660,103     Dated May 2, 1972

Inventor(s) Helmut Kampfer et al     -/-

It is certified that error appears in the above-identified patent and that said Letters Patent are hereby corrected as shown below:

Column 6, compound 29, the right hand of the formula should read as follows:

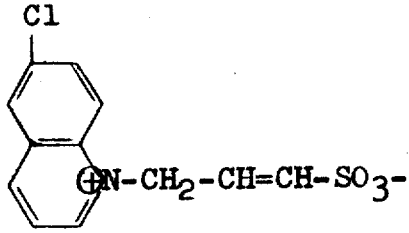

Column 6, compound 30, the right hand of the formula should read as follows:

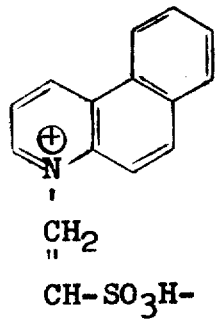

Column 12, claim 5, the right hand of the formula should read as follows:

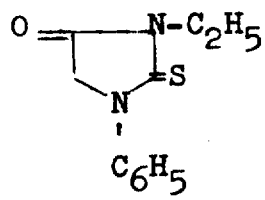

Patent No. 3,660,103  Dated May 2, 1972

Inventor(s) Helmut Kampfer et al

---

Column 12, claim 6, the right hand of the formula should read as follows:

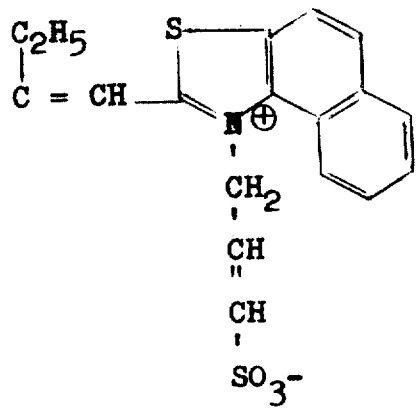

Signed and sealed this 9th day of January 1973.

(SEAL)
Attest:

EDWARD M. FLETCHER, JR.
Attesting Officer

ROBERT GOTTSCHALK
Commissioner of Patents